US012808677B2

(12) United States Patent
Kim

(10) Patent No.: US 12,808,677 B2
(45) Date of Patent: Nov. 24, 2026

(54) APPARATUS AND METHOD FOR DRIVER PATTERN-BASED ROUTE GUIDANCE

(71) Applicants: HYUNDAI MOTOR COMPANY, Seoul (KR); KIA CORPORATION, Seoul (KR)

(72) Inventor: Sehee Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 257 days.

(21) Appl. No.: 18/628,671

(22) Filed: Apr. 5, 2024

(65) Prior Publication Data

US 2025/0130057 A1 Apr. 24, 2025

(30) Foreign Application Priority Data

Oct. 20, 2023 (KR) ........................ 10-2023-0141507

(51) Int. Cl.
*G01C 21/34* (2006.01)
*G01C 21/36* (2006.01)

(52) U.S. Cl.
CPC ..... *G01C 21/3484* (2013.01); *G01C 21/3492* (2013.01); *G01C 21/3617* (2013.01); *G01C 21/3691* (2013.01)

(58) Field of Classification Search
CPC ............ G01C 21/3484; G01C 21/3492; G01C 21/3617; G01C 21/3691; G01C 21/3415; G06Q 50/40
See application file for complete search history.

(56) References Cited

U.S. PATENT DOCUMENTS

2004/0143381 A1* 7/2004 Regensburger .... G01C 21/3602 701/1
2009/0005965 A1* 1/2009 Forstall .............. G01C 21/3484 701/533

FOREIGN PATENT DOCUMENTS

JP 2006252533 A * 9/2006 ........... G08G 1/0969

* cited by examiner

*Primary Examiner* — Anne Marie Antonucci
*Assistant Examiner* — Jewel A Kuntz
(74) *Attorney, Agent, or Firm* — MCDONNELL BOEHNEN HULBERT & BERGHOFF LLP

(57) ABSTRACT

An apparatus for driver pattern-based route guidance is provided, and may include a queue entry determining unit configured to determine whether a driver's vehicle has entered the waiting queue at a beginning of a waiting queue of a first entry or exit road, a weight value setting unit configured to, when the vehicle has not entered the waiting queue, assign a first weight value to a first route passing through the first entry or exit road based on a currently remaining distance from the driver's vehicle to the first entry or exit road and driver's personal pattern, and an entry or exit route guiding unit configured to guide a customized entry or exit route to the driver by comparing the first weight value of the first route with a second weight value of a second route passing through a predetermined second entry or exit road.

12 Claims, 8 Drawing Sheets

APPARATUS AND METHOD FOR DRIVER PATTERN-BASED ROUTE GUIDANCE

CROSS-REFERENCE TO RELATED APPLICATION

This application claims priority to and the benefit of Korean Patent Application No. 10-2023-0141507 filed in the Korean Intellectual Property Office on Oct. 20, 2023, the entire contents of which is incorporated herein by reference.

BACKGROUND

(a) Field

The present disclosure relates to an apparatus and method for driver pattern-based route guidance. More particularly, the present disclosure relates to an apparatus and method for driver pattern-based route guidance capable of guiding a route based on the driver's driving pattern when entering or exiting another road.

(b) Description of the Related Art

In a situation where the navigation route guides a driver to an entry or exit route, if the route has not been frequently experienced or the queue for the entry or exit route is long, the driver may pass over the queue because the driver is not aware of whether it is the actual starting point of the queue to be entered or exited.

In this case, it must be decided to enter even in the middle of the entry or exit waiting queue, or to drive on a different entry or exit route if it is difficult to enter the queue in the middle. Depending on the driver's personal pattern and waiting queue situation, there may be cases where it is possible to enter the middle of the queue without difficulty. However, if entering in the middle of the queue is difficult, attempting to enter is not only dangerous, but may also cause traffic congestion in the lane next to the entry and exit lane.

SUMMARY

The present disclosure attempts to provide an apparatus and method for driver pattern-based route guidance capable of, when a waiting queue of an entry or exit road is long in a situation of entering or exiting another road is required, providing a comparable route to the driver based on a driver's personal pattern and waiting queue situation.

The present disclosure attempts to provide an apparatus and method for driver pattern-based route guidance capable of determining, when a start point of a waiting queue is passed over, whether another entry or exit route is to be immediately guided or the existing entry or exit route guidance is to be maintained, according to vehicle navigation-guided route and driving lane information, distance information, and a driver's personalized pattern.

An apparatus for driver pattern-based route guidance may include a queue entry determining unit configured to determine whether a driver's vehicle has entered the waiting queue at a beginning of a waiting queue of a first entry or exit road, a weight value setting unit configured to, when the vehicle has not entered the waiting queue, assign a first weight value to a first route passing through the first entry or exit road based on a currently remaining distance from the driver's vehicle to the first entry or exit road and driver's personal pattern, and an entry or exit route guiding unit configured to guide a customized entry or exit route to the driver by comparing the first weight value of the first route with a second weight value of a second route passing through a predetermined second entry or exit road.

The queue entry determining unit may be configured to receive a location of the driver's vehicle on a lane-by-lane basis through a global navigation satellite system (GNSS), and to determine whether the vehicle has entered lane of the waiting queue of the first entry or exit road based on the received location of the vehicle on a lane-by-lane basis.

The weight value setting unit may be configured to assign the first weight value by additionally considering a congestion situation or a vehicle saturation degree of the waiting queue.

The weight value setting unit may be configured to calculate the vehicle saturation degree in real time based on a length of the waiting queue, the number of waiting vehicles, an average moving speed of the waiting vehicles, and traffic information.

An apparatus for driver pattern-based route guidance may further include a driver pattern detector configured to detect the driver's personal pattern through a driver pattern model modelled based on driver's driving record, where the driver pattern detector may be configured to detect the driver's personal pattern based on an average entry distance, which is an average value of the remaining distance to the entry or exit road at a time point at which the driver enters a waiting queue of the entry or exit road.

The driver pattern detector may be configured to detect the driver's personal pattern based on an average entry timing, which is an average value of time taken from a time point of turning on a turn signal to entry when the driver enters the waiting queue of the entry or exit road.

The weight value setting unit may be configured to, when the remaining distance to the first entry or exit road is larger than the average entry distance of the driver, determine the first weight value to be larger than the second weight value.

The weight value setting unit may be configured to, when the remaining distance to the first entry or exit road is smaller than the average entry distance of the driver, determine the first weight value to be smaller than the second weight value.

The weight value setting unit may be configured to, even when the remaining distance to the first entry or exit road is smaller than the average entry distance of the driver, if the vehicle saturation degree calculated in real time is smaller than a preset criterion, determine the first weight value to be larger than the second weight value.

The weight value setting unit may be configured to determine the first weight value to be smaller than the second weight value when the remaining distance to the first entry or exit road is smaller than a minimum enterable distance depending on the driver's personal pattern, even when the remaining distance to the first entry or exit road is smaller than the average entry distance of the driver and the vehicle saturation degree is smaller than the preset criterion.

A method for driver pattern-based route guidance may include providing a route including at least one entry or exit road to a destination through a navigation system, determining whether a driver's vehicle has entered the waiting queue at a beginning of a waiting queue of a first entry or exit road, assigning a first weight value to a first route passing through the first entry or exit road based on a currently remaining distance from the driver's vehicle to the first entry or exit road and driver's personal pattern, when the vehicle has not entered the waiting queue, and guiding a customized route to the driver by comparing the first weight value of the first route with a second weight value of a second route passing through a predetermined second entry or exit road.

The assigning the first weight value to the first route may include assigning the first weight value by additionally considering a congestion situation or a vehicle saturation degree of the waiting queue.

The assigning the first weight value by additionally considering the congestion situation or the vehicle saturation degree of the waiting queue may include calculating the vehicle saturation degree in real time based on a length of the waiting queue, the number of waiting vehicles, average moving speed of the waiting vehicles, and traffic information.

The assigning the first weight value to the first route may include generating a driver's personal pattern model based on an average entry distance, which is an average value of the remaining distance to the entry or exit road at a time point at which the driver enters a waiting queue of the entry or exit road, and detecting the driver's personal pattern through the driver's personal pattern model.

The detecting the driver's personal pattern may include detecting the driver's personal pattern based on an average entry timing, which is an average value of time taken from a time point of turning on a turn signal to entry when the driver enters the waiting queue of the entry or exit road.

The assigning the first weight value to the first route may include determining the first weight value to be larger than the second weight value when the remaining distance to the first entry or exit road is larger than the average entry distance of the driver.

The assigning the first weight value to the first route may further include determining the first weight value to be smaller than the second weight value when the remaining distance to the first entry or exit road is smaller than the average entry distance of the driver.

The assigning the first weight value to the first route may further include determining the first weight value to be larger than the second weight value if the vehicle saturation degree calculated in real time is smaller than a preset criterion, even when the remaining distance to the first entry or exit road is smaller than the average entry distance of the driver.

The assigning the first weight value to the first route may further include determining the first weight value to be smaller than the second weight value when the remaining distance to the first entry or exit road is smaller than a minimum enterable distance depending on the driver's personal pattern, even when the remaining distance to the first entry or exit road is smaller than the average entry distance of the driver and the vehicle saturation degree is smaller than the preset criterion.

The determining whether the driver's vehicle has entered the waiting queue at the beginning of the waiting queue of the first entry or exit road may include receiving a location of the driver's vehicle on a lane-by-lane basis through a global navigation satellite system (GNSS), and determining whether the vehicle has entered lane of the waiting queue of the first entry or exit road based on the received location of the vehicle on a lane-by-lane basis.

An apparatus and method for driver pattern-based route guidance according to an embodiment may, when a waiting queue of an entry or exit road is long in a situation of entering or exiting another road is required, provide a comparable route to the driver based on a driver's personal pattern and waiting queue situation.

An apparatus and method for driver pattern-based route guidance according to an embodiment may determine when a start point of a waiting queue is passed over, whether another entry or exit route is to be immediately guided or the existing entry or exit route guidance is to be maintained, according to vehicle navigation-guided route and driving lane information, distance information, and a driver's personalized pattern.

DETAILED DESCRIPTION

Figure 1:
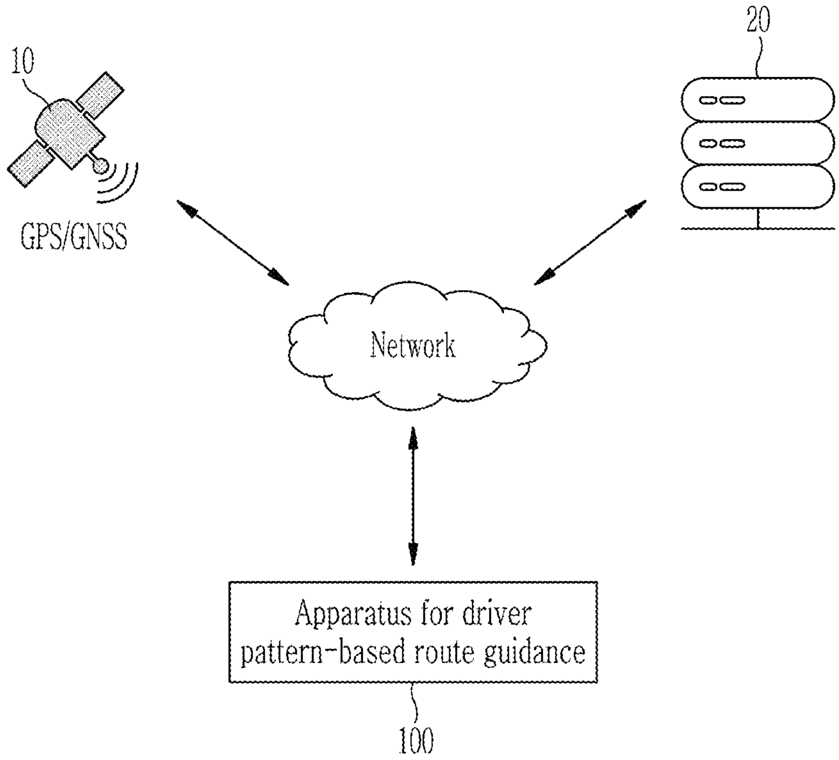
FIG. 1 schematically shows a system for driver pattern-based route guidance according to an embodiment.

An embodiment of the disclosure will be described more fully hereinafter with reference to the accompanying drawings such that a person of skill in the art may easily implement the embodiment. As those skilled in the art would realize, the described embodiments may be modified in various different ways, all without departing from the spirit or scope of the present disclosure. In order to clarify the present disclosure, parts that are not related to the description will be omitted, and the same elements or equivalents are referred to with the same reference numerals throughout the specification.

In addition, unless explicitly described to the contrary, the word "comprise" and variations such as "comprises" or "comprising" will be understood to imply the inclusion of stated elements but not the exclusion of any other elements. Terms including an ordinary number, such as first and second, are used for describing various constituent elements, but the constituent elements are not limited by the terms. The terms are only used to differentiate one component from other components.

In addition, the terms "unit", "part" or "portion", "-er", and "module" in the specification refer to a unit that processes at least one function or operation, which may be implemented by hardware, software, or a combination of hardware and software.

Hereinafter, embodiments of the present disclosure will be described with reference to the drawings.

FIG. 1 schematically shows a system for driver pattern-based route guidance according to an embodiment.

Referring to FIG. 1, a system for driver pattern-based route guidance may include a GNSS 10, a database 20 and an apparatus for driver pattern-based route guidance 100.

The GNSS 10 stands for Global Navigation Satellite System and is a global positioning information service system. The GNSS 10 may provide precise positioning information to anyone, anywhere, at any time by using radio waves transmitted from satellites. The GNSS 10 may be a concept that includes a global positioning system (GPS). The GNSS 10 may be connected to an apparatus 100 for driver pattern-based route guidance through a network, to provide a navigation route. The GNSS 10 may provide locations and movement data of the driver's vehicle and other vehicles on the route or a waiting queue to the apparatus 100 for driver pattern-based route guidance.

The GNSS 10 may provide the location of the driver's vehicle on a lane-by-lane basis through precise positioning technology. The GNSS 10 provides a remaining distance of the driver's vehicle to an entry or exit road.

The database 20 may store a driver's personal pattern. The database 20 may store a driver's driving record for detecting the driver's personal pattern. The database 20 may store a driver pattern model generated through the driver's driving record.

When the driver's vehicle having passed over a waiting queue start point of the entry or exit road is travelling in a lane next to a queue lane, the apparatus 100 for driver pattern-based route guidance may guide entry or exit route to the driver based on the driver's personal pattern and a vehicle saturation degree of the waiting queue.

The apparatus 100 for driver pattern-based route guidance may determine whether that driver may enter that the waiting queue, by utilizing the vehicle saturation degree of the waiting queue and personal pattern data related to driver's entry into entry or exit route.

That is, the apparatus 100 for driver pattern-based route guidance may determine how many meters should remain at maximum for the driver's vehicle to enter the waiting queue, and guide the entry or exit route.

Figure 2:
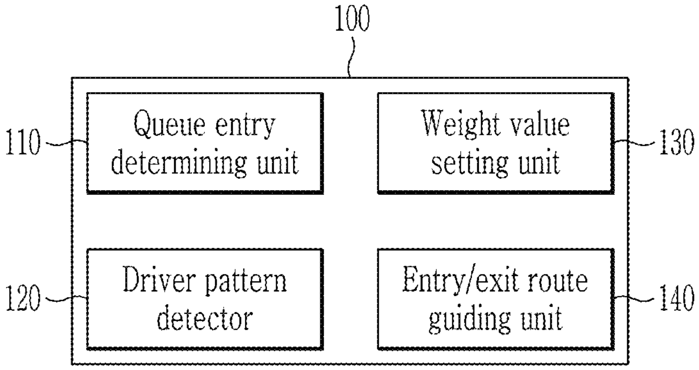
FIG. 2 is a block diagram of an apparatus for driver pattern-based route guidance according to an embodiment.

FIG. 2 is a block diagram of an apparatus for driver pattern-based route guidance according to an embodiment.

Referring to FIG. 2, the apparatus 100 for driver pattern-based route guidance may include a queue entry determining unit 110, a driver pattern detector 120, a weight value setting unit 130, and an entry or exit route guiding unit 140.

While the driver's vehicle is traveling along a route passing through at least one entry or exit road, the queue entry determining unit 110 may determine whether the driver's vehicle has entered the waiting queue at a beginning of the waiting queue of a first entry or exit road. Here, the entry or exit road may be a concept that includes an entry road to enter another road or an exit road to exit to another road. The term another road may include national highways, expressways, expressways, etc.

The queue entry determining unit 110 may receive a location of the driver's vehicle on a lane-by-lane basis through a global navigation satellite system (GNSS). The queue entry determining unit 110 may determine whether the vehicle has entered the lane of the waiting queue of the first entry or exit road, based on the received location of the vehicle on a lane-by-lane basis.

The driver pattern detector 120 may detect the driver's personal pattern through the driver pattern model modeled based on the driver's driving record.

For example, the driver pattern detector 120 may model the driver pattern model based on a driving record that includes the driver's navigation record, lane change pattern, waiting queue entry pattern, driving speed, driving style, preferred route, and the like.

The driver pattern detector 120 may detect the driver's personal pattern based on an average entry distance, which is an average value of the remaining distance to the entry or exit road, at the time point when the driver enters the waiting queue of the entry or exit road.

The driver pattern detector 120 may detect the driver's personal pattern through the driver pattern model such as whether the driver tends to force the desired way or chooses another route when the driver enters the waiting queue after passing over the beginning of the waiting queue.

The driver pattern detector 120 may detect the driver's personal pattern based on an average entry timing, which is an average value of time taken from a time point of turning on a turn signal to entry when the driver enters the waiting queue of the entry or exit road.

For example, when it takes less than 3 seconds in the average from the time point of turning on the turn signal to enter the waiting queue after the driver passes over a beginning of the waiting queue of the entry or exit road, the driver pattern detector 120 may determine the driver's personal pattern as a pattern preferring forcing entry rather than choosing another route.

When the vehicle has not entered the waiting queue, the weight value setting unit 130 may assign a first weight value to a first route passing through the first entry or exit road based on the currently remaining distance from the driver's vehicle to the first entry or exit road and the driver's personal pattern.

The weight value setting unit 130 may assign the first weight value by additionally considering a congestion situation or the vehicle saturation degree of the waiting queue.

The weight value setting unit 130 may calculate the vehicle saturation degree in real time based on the length of the waiting queue, the number of waiting vehicles, an average moving speed of the waiting vehicles, and traffic information.

When the remaining distance to the first entry or exit road is larger than the driver's average entry distance, the weight value setting unit 130 may determine the first weight value to be larger than a second weight value. The second weight value may be a weight value for selecting a second route passing through a second entry or exit road. The second weight value is a weight value for the second route, and preset to be smaller than the weight value for the first route when the route is set through a navigation system.

The weight value setting unit 130 may determine the first weight value to be larger or smaller than the second weight value depending on whether entry to the first entry or exit road is selected, so as to provide premises (i.e., key factor) for determining whether the existing first route is to be maintained or another second route is to be selected.

When the remaining distance to the first entry or exit road is smaller than driver's average entry distance, the weight value setting unit 130 may determine the first weight value to be smaller than the second weight value.

Even when the remaining distance to the first entry or exit road is smaller than driver's average entry distance, if the vehicle saturation degree calculated in real time is smaller than a preset criterion, the weight value setting unit 130 may determine the first weight value to be larger than the second weight value.

Even when the remaining distance to the first entry or exit road is smaller than the driver's average entry distance and the vehicle saturation degree is smaller than the preset criterion, when the remaining distance to the first entry or exit road is smaller than a minimum enterable distance depending on the driver's personal pattern, the weight value setting unit 130 may determine the first weight value to be smaller than the second weight value.

The entry or exit route guiding unit 140 may guide a customized entry or exit route to the driver by comparing the first weight value of the first route with the second weight value of the second route passing through the predetermined second entry or exit road. That is, the entry or exit route guiding unit 140 may guide the first route when the first weight value is larger than the second weight value, and guide the second route when the second weight value is larger than the first weight value.

Figure 3:
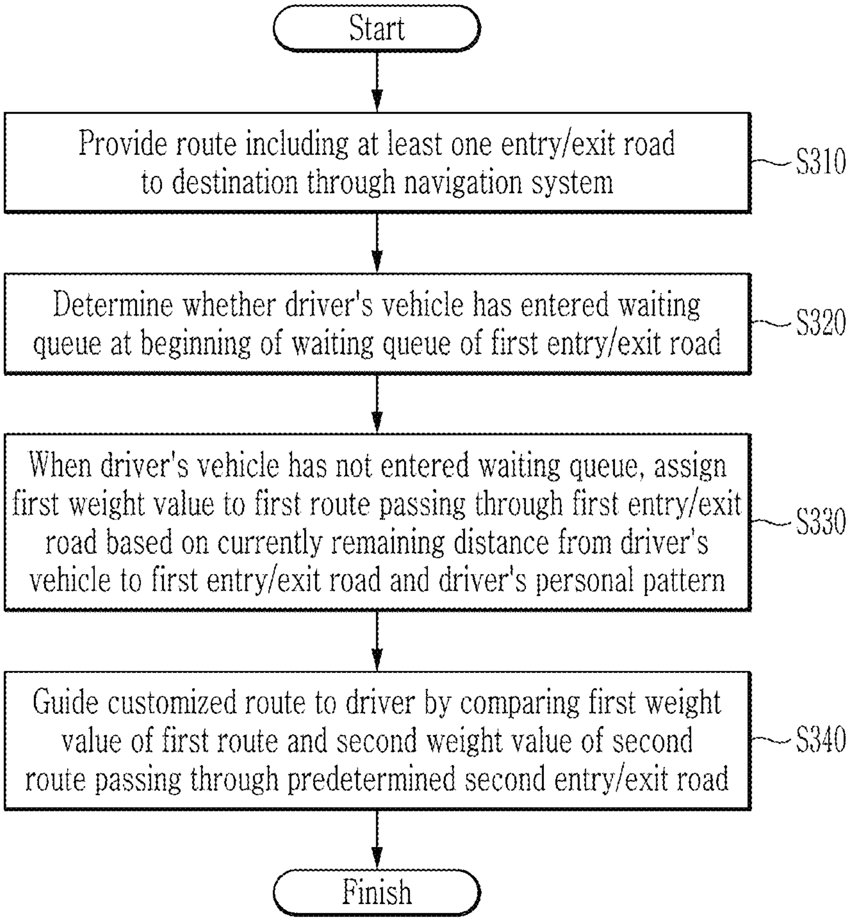
FIG. 3 is a flowchart of a method for driver pattern-based route guidance according to an embodiment.

FIG. 3 is a flowchart of a method for driver pattern-based route guidance according to an embodiment. A method for driver pattern-based route guidance may be performed through the apparatus 100 for driver pattern-based route guidance (refer to FIG. 1).

In FIG. 3, at step S310, the apparatus 100 for driver pattern-based route guidance may provide a route including at least one entry or exit road to a destination through the navigation system.

At step S320, the apparatus 100 for driver pattern-based route guidance may determine whether the driver's vehicle has entered the waiting queue at a beginning of the waiting queue of the first entry or exit road.

The apparatus 100 for driver pattern-based route guidance may receive the location of the driver's vehicle on a lane-by-lane basis through the global navigation satellite system (GNSS). The apparatus 100 for driver pattern-based route guidance may determine whether the driver's vehicle has entered lane of the waiting queue of the first entry or exit road, based on the received location of the vehicle on a lane-by-lane basis.

At step S330, when the driver's vehicle has not entered the waiting queue, the apparatus 100 for driver pattern-based route guidance may assign the first weight value to the first route passing through the first entry or exit road based on the currently remaining distance from the driver's vehicle to the first entry or exit road and the driver's personal pattern.

The apparatus 100 for driver pattern-based route guidance may assign the first weight value by additionally considering the congestion situation or the vehicle saturation degree of the waiting queue. The apparatus 100 for driver pattern-based route guidance may calculate the vehicle saturation degree in real time based on the length of the waiting queue, the number of waiting vehicles, the average moving speed of waiting vehicle, and traffic information.

The apparatus 100 for driver pattern-based route guidance may generate the driver's personal pattern model based on an average entry distance, which is an average value of the remaining distance to the entry or exit road, at the time point when the driver enters the waiting queue of the entry or exit road. The apparatus 100 for driver pattern-based route guidance may detect the driver's personal pattern through the driver's personal pattern model.

When the driver enters the waiting queue of the entry or exit road, the apparatus 100 for driver pattern-based route guidance may detect the driver's personal pattern based on the average entry timing, which is an average value of time taken from a time point of turning on a turn signal to entry.

When the remaining distance to the first entry or exit road is larger than the driver's average entry distance, the apparatus 100 for driver pattern-based route guidance may determine the first weight value to be larger than the second weight value of the second route passing through the second entry or exit road.

When the remaining distance to the first entry or exit road is smaller than driver's average entry distance, the apparatus 100 for driver pattern-based route guidance may determine the first weight value to be smaller than the second weight value.

Even when the remaining distance to the first entry or exit road is smaller than the driver's average entry distance, if the vehicle saturation degree calculated in real time is smaller than the preset criterion, the apparatus 100 for driver pattern-based route guidance may determine the first weight value to be larger than the second weight value.

Even when the remaining distance to the first entry or exit road is smaller than the average entry distance of the driver and the vehicle saturation degree is smaller than the preset criterion, when the remaining distance to the first entry or exit road is smaller than the minimum enterable distance depending on the driver's personal pattern, the apparatus 100 for driver pattern-based route guidance may determine the first weight value to be smaller than the second weight value.

At step S340, the apparatus 100 for driver pattern-based route guidance may guide a customized route to the driver by comparing the first weight value of the first route with the second weight value of the second route passing through the predetermined second entry or exit road. The apparatus 100 for driver pattern-based route guidance provides guidance along a route having a larger weight value among the first weight value and the second weight value.

Figure 4:
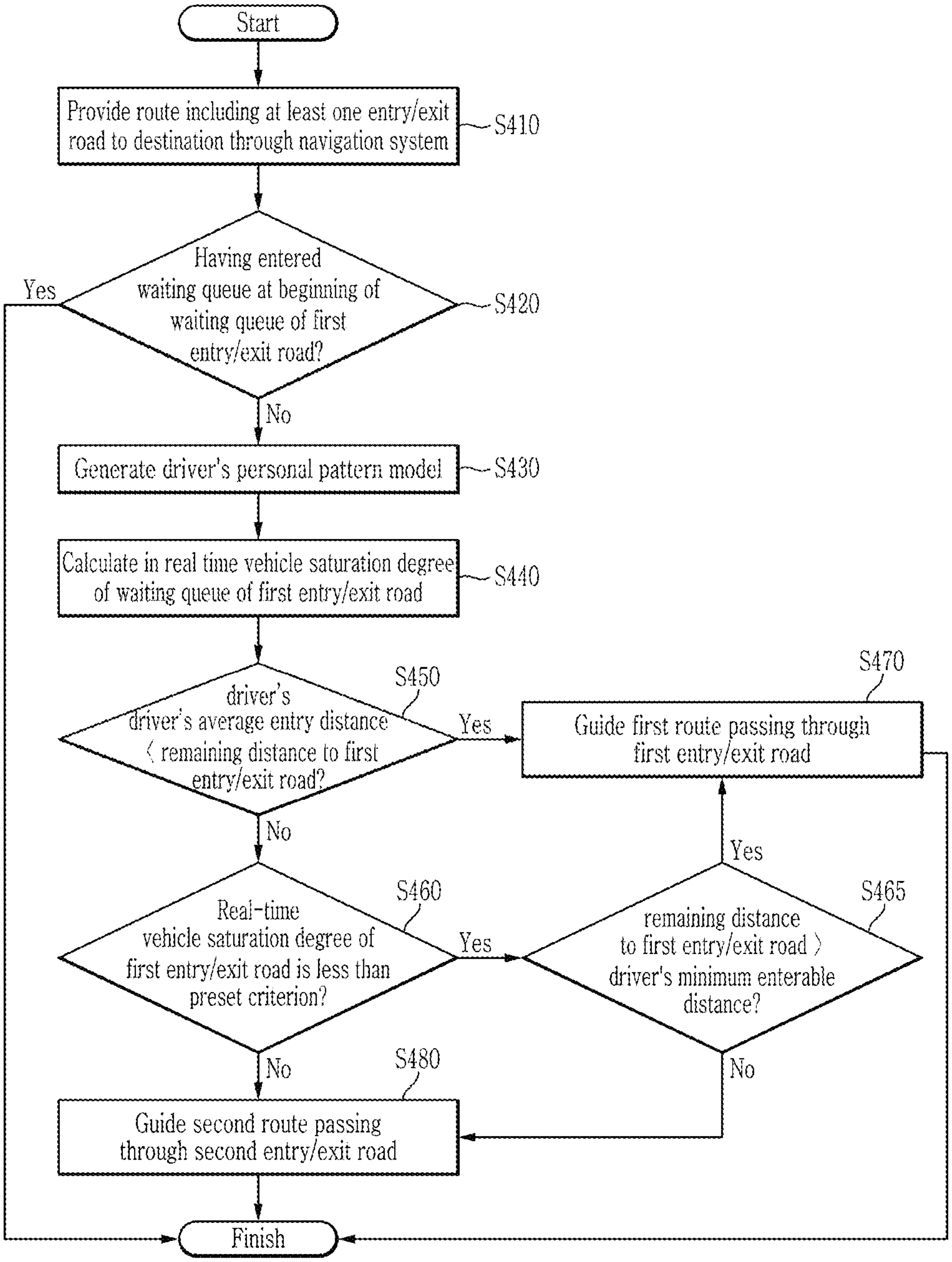
FIG. 4 is a flowchart of a method for driver pattern-based route guidance according to an embodiment.

FIG. 4 is a flowchart of a method for driver pattern-based route guidance, according to an embodiment. The method for driver pattern-based route guidance of FIG. 4 may be performed through the apparatus 100 for driver pattern-based route guidance (refer to FIG. 1).

In FIG. 4, at step S410, the apparatus 100 for driver pattern-based route guidance may provide the route including at least one entry or exit road to the destination through the navigation system.

At step S420, the apparatus 100 for driver pattern-based route guidance may determine whether the driver's vehicle has entered the waiting queue at the beginning of the waiting queue of the first entry or exit road.

When the driver's vehicle has not entered the waiting queue at the beginning of the waiting queue of the first entry or exit road, the apparatus 100 for driver pattern-based route guidance provides route guidance based on the driver's personal pattern and the vehicle saturation degree of the waiting queue.

At step S430, the apparatus 100 for driver pattern-based route guidance may generate the driver's personal pattern model and detect the driver's personal pattern. The driver's personal pattern may include the average entry distance, which is an average value of the remaining distance to the entry or exit road at the time point when the driver enters the waiting queue of the entry or exit road.

The apparatus 100 for driver pattern-based route guidance may generate the driver's personal pattern model based on the driver's driving record of the database 20 (refer to FIG. 1).

At step S440, the apparatus 100 for driver pattern-based route guidance may calculate the vehicle saturation degree of the waiting queue of the first entry or exit road in real time. The vehicle saturation degree may determine the congestion level of vehicles.

At step S450, the apparatus 100 for driver pattern-based route guidance may compare the driver's average entry distance with the current remaining distance to the first entry or exit road.

At step S470, when the current remaining distance to the first entry or exit road is larger than the driver's average entry distance, the apparatus 100 for driver pattern-based route guidance may maintain guiding the first route entering the waiting queue of the first entry or exit road.

At step S460, when the current remaining distance to the first entry or exit road is smaller than the driver's average entry distance, the apparatus 100 for driver pattern-based route guidance may compare the real-time vehicle saturation degree of the first entry or exit road with the preset criterion.

At step S480, when the real-time vehicle saturation degree of the first entry or exit road is larger than the preset criterion, the apparatus 100 for driver pattern-based route guidance may guide the second route passing through the second entry or exit road without entering the first entry or exit road.

At step S465, when the real-time vehicle saturation degree of the first entry or exit road is smaller than the preset criterion, the apparatus 100 for driver pattern-based route guidance may compare the remaining distance of the driver's vehicle to the first entry or exit road and the driver's minimum enterable distance according to the driver's personal pattern. The minimum enterable distance may be a minimum distance to the entry or exit road required for the driver to enter the waiting queue.

At step S470, when the remaining distance to the first entry or exit road is larger than the driver minimum enterable distance according to the driver's personal pattern, the apparatus 100 for driver pattern-based route guidance may guide the first route entering the waiting queue of the first entry or exit road.

At step S480, when the remaining distance to the first entry or exit road is smaller than the driver minimum enterable distance according to the driver's personal pattern, the apparatus 100 for driver pattern-based route guidance may guide the second route passing through the second entry or exit road.

Figure 5:
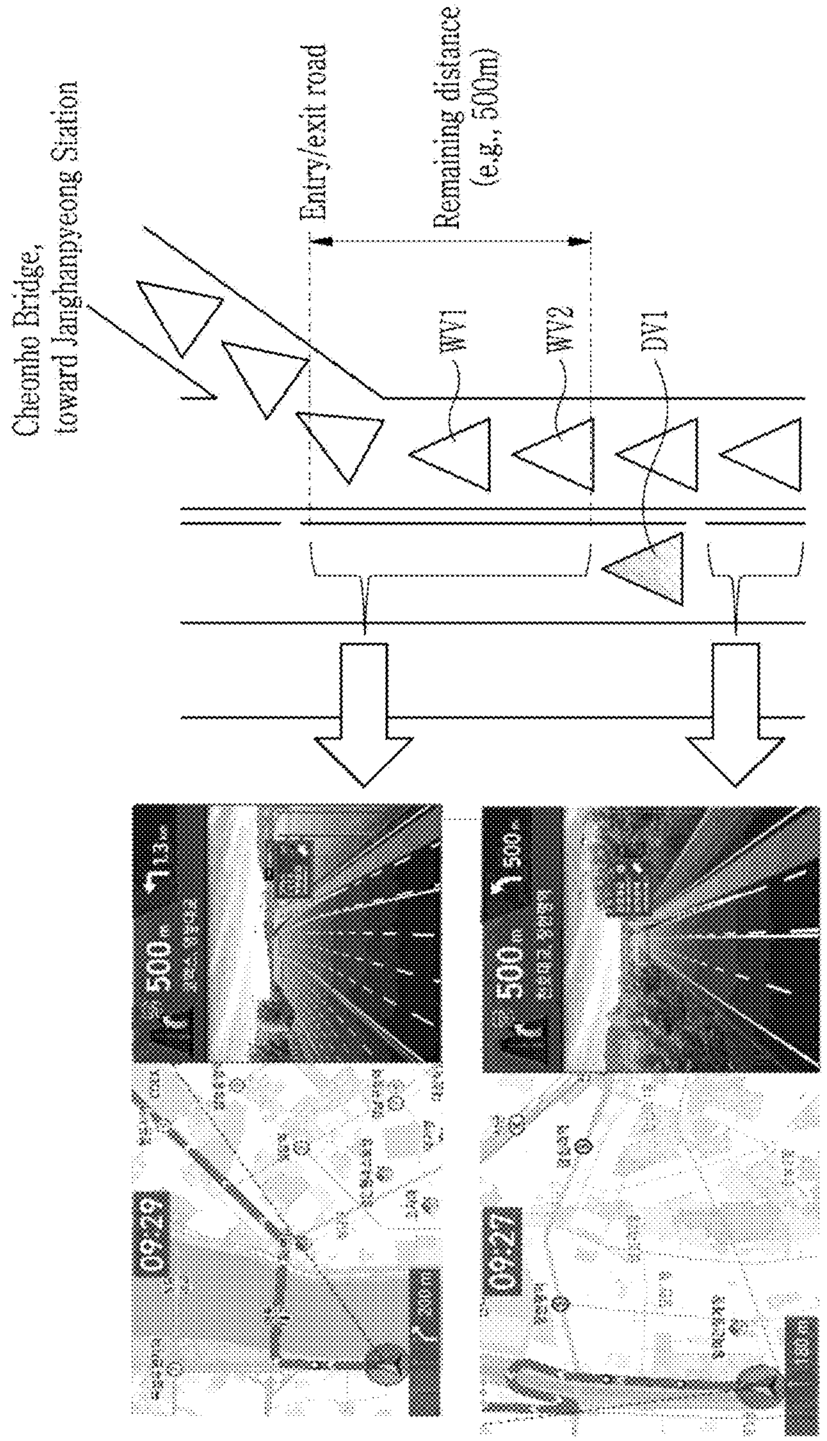
FIG. 5 shows an example of a method for driver pattern-based route guidance according to an embodiment.
Figure 6:
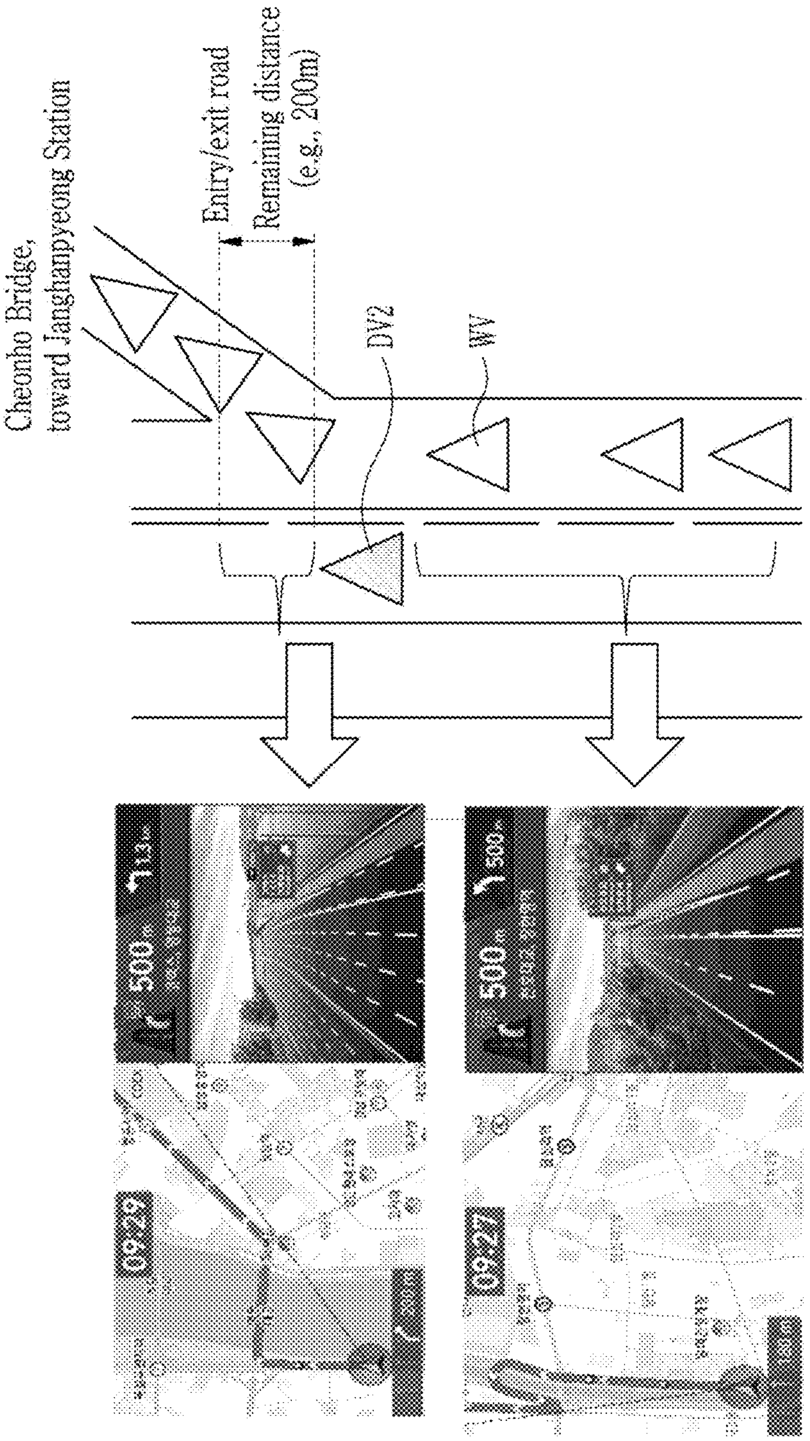
FIG. 6 shows an example of a method for driver pattern-based route guidance according to an embodiment.
Figure 7:
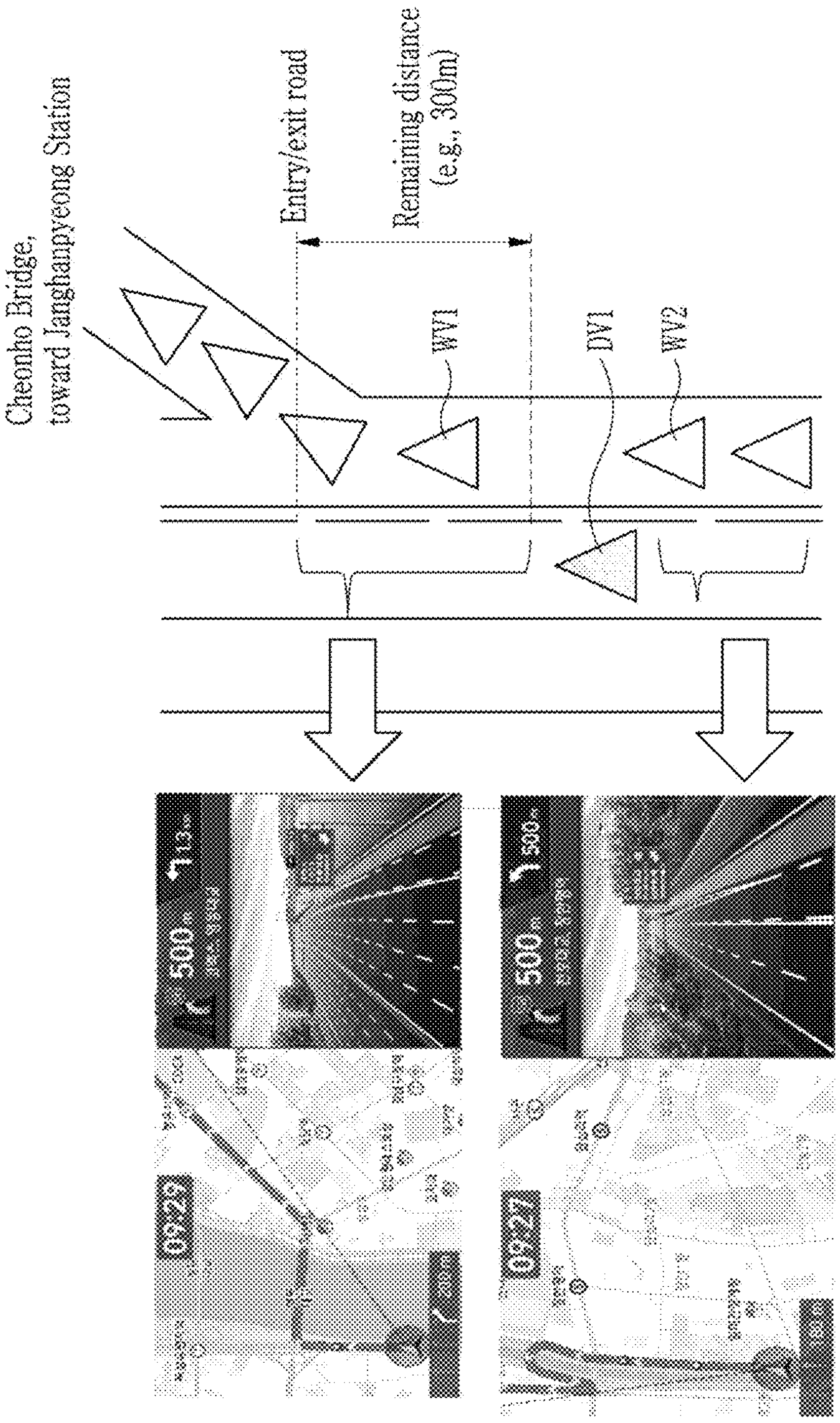
FIG. 7 shows an example of a method for driver pattern-based route guidance according to an embodiment.

FIG. 5 to FIG. 7 show examples of a method for driver pattern-based route guidance according to an embodiment.

In FIG. 5 to FIG. 7, when the driver's vehicle has passed over start point at the beginning of entry or exit the waiting queue in the current guiding route of the navigation, the apparatus 100 for driver pattern-based route guidance (refer to FIG. 1) provides different entry or exit guidance depending on the driver's personal pattern and the waiting queue situation.

FIG. 5 shows the case that, in the case of a first driver, the vehicle saturation degree of the waiting queue is greater than or equal to the preset criterion.

In FIG. 5, a first driver's average entry distance is assumed to be about 400 meters, which is smaller than 500 meters. The vehicle saturation degree of the waiting queue may be determined based on an interval between two waiting vehicles WV1 and WV2 of the waiting queue. The current vehicle saturation degree of the waiting queue is assumed to be greater than or equal to the preset criterion.

In the case of a vehicle DV1 of the first driver, since currently 500 meters remain to the entry or exit road to enter or exit toward Janghanpyeong Station, Cheonho Bridge, despite the vehicle saturation degree, the apparatus 100 for driver pattern-based route guidance may maintain guiding the current route entering the waiting queue of the entry or exit road.

When the vehicle DV1 of the first driver does fails to enter the current waiting queue and the remaining distance becomes less than 400 meters, the apparatus 100 for driver pattern-based route guidance may guide another route.

FIG. 6 shows the case that, in the case of a second driver, the vehicle saturation degree of the waiting queue is less than the preset criterion.

In FIG. 6, a second driver's average entry distance is assumed to be about 150 meters. The vehicle saturation degree of the waiting queue may be assumed to be less than the preset criterion depending on the interval of waiting vehicles WV.

In the case of a vehicle DV2 of the second driver, since about 200 meters currently remain to the entry or exit road to enter or exit toward Janghanpyeong Station, Cheonho Bridge, guidance of the current route entering the waiting queue of the entry or exit road may be maintained.

However, when the vehicle DV2 of the second driver does fails to enter the waiting queue and the remaining distance becomes less than 150 meters that is the average entry distance, the apparatus 100 for driver pattern-based route guidance may guide another route.

FIG. 7 shows the case that, in the case of the first driver, the vehicle saturation degree of the waiting queue is less the preset criterion.

The first driver's average entry distance is assumed to be about 400 meters, which is smaller than 500 meters. The first driver's minimum enterable distance is assumed to be about 250 meters.

In the case of the current vehicle DV1 of the first driver, since it is currently driving at a remaining distance of about 300 meters to the entry or exit road, the remaining distance is smaller than the first driver's average entry distance of 400 meters.

However, since the vehicle saturation degree of the current waiting queue is less than the preset criterion, when the remaining distance is greater than the first driver's minimum enterable distance, the apparatus 100 for driver pattern-based route guidance may maintain guiding the current route entering the waiting queue of the entry or exit road.

The first driver's minimum enterable distance is about 250 meters, which is smaller than is the current remaining distance of 300 meters. Therefore, the apparatus 100 for driver pattern-based route guidance may maintain guiding the current route entering the waiting queue of the entry or exit road.

However, when the vehicle DV1 of the first driver does fails to enter the waiting queue and the remaining distance to the entry or exit road becomes less than 250 meters, the apparatus 100 for driver pattern-based route guidance may guide another route that does not enter the entry or exit road.

Figure 8:
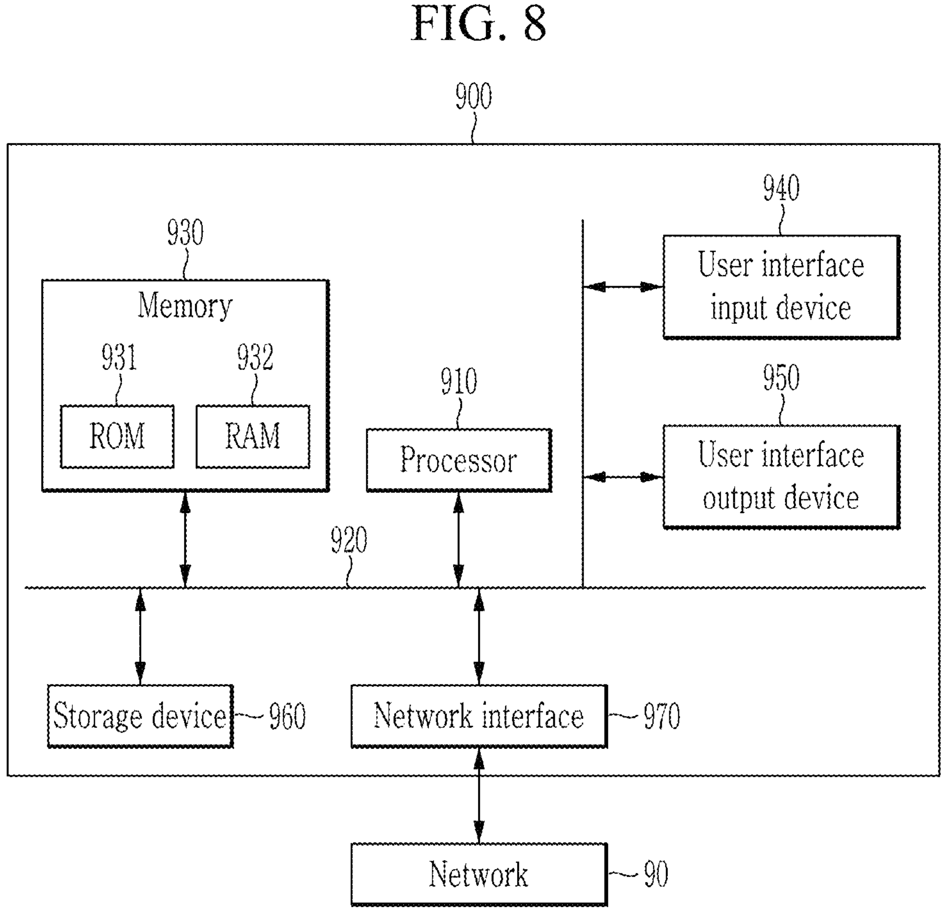
FIG. 8 is drawing for explaining a computing device according to an embodiment.

FIG. 8 is drawing for explaining a computing device according to an embodiment.

Referring to FIG. 8, an apparatus and method for driver pattern-based route guidance according to an embodiment may be implemented by using a computing device 900.

The computing device 900 may include at least one of a processor 910, a memory 930, an user interface input device 940, an user interface output device 950 and a storage device 960 that communicate through a bus 920. The computing device 900 may also include a network interface 970 electrically connected to a network 90. The network interface 970 may transmit or receive signals with other entities through the network 90.

The processor 910 may be implemented in various types such as a micro controller unit (MCU), an application processor (AP), a central processing unit (CPU), a graphic processing unit (GPU), a neural processing unit (NPU), and the like, and may be any type of semiconductor device capable of executing instructions stored in the memory 930 or the storage device 960. The processor 910 may be configured to implement the functions and methods described above with respect to FIG. 1 to FIG. 7.

The memory 930 and the storage device 960 may include various types of volatile or non-volatile storage media. For example, the memory may include read-only memory (ROM) 931 and a random-access memory (RAM) 932. In this embodiment, the memory 930 may be located inside or outside the processor 910, and the memory 930 may be connected to the processor 910 through various known means.

In some embodiments, at least some configurations or functions of an apparatus and method for driver pattern-based route guidance according to an embodiment may be implemented as a program or software executable by the computing device 900, and program or software may be stored in a computer-readable medium.

In some embodiments, at least some configurations or functions of an apparatus and method for driver pattern-based route guidance according to an embodiment may be implemented by using hardware or circuitry of the computing device 900, or may also be implemented as separate hardware or circuitry that may be electrically connected to the computing device 900.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for driver pattern-based route guidance, the apparatus comprising:

a memory storing executable instructions; and a processor configured to access the memory and execute the instructions, wherein the instructions comprise:

receiving lane-level position information of a vehicle;

determining whether the vehicle has entered a waiting queue lane at a beginning of a waiting queue of a first entry or exit road based on the lane-level position information;

in response to determining that the vehicle has not entered the waiting queue, determining a first weight value for a first route passing through the first entry or exit road by:

calculating, in real time, a vehicle saturation degree of the waiting queue based on at least one of a length of the waiting queue, a number of waiting vehicles, an average moving speed of the waiting vehicles, and traffic information;

generating a driver pattern model based on a driving record including at least one of navigation history, lane change pattern, queue entry pattern, and driving speed;

detecting a driver personal pattern including an average entry distance defined as an average remaining distance at which the vehicle enters the waiting queue, and an average entry timing defined as an average time from turn signal activation to queue entry;

comparing a current remaining distance to the first entry or exit road with the average entry distance;

determining the first weight value based on the comparison of the current remaining distance to the average entry distance, the vehicle saturation degree, and a minimum enterable distance derived from the driver personal pattern;

comparing the first weight value with a second weight value for a second route passing through a second entry or exit road; and controlling a navigation system to selectively maintain guidance of the first route when the first weight value is greater than the second value weight, or switch to the second route when the second weight value is greater than the first value weight.

2. The apparatus of claim 1, wherein the lane-level position information of a vehicle is received from a global navigation satellite system (GNSS).

3. The apparatus of claim 1, wherein the instructions further comprise increasing the first weight value relative to the second weight value when the remaining distance exceeds the average entry distance by a predetermined margin.

4. The apparatus of claim 3, wherein the instructions further comprise decreasing the first weight value relative to the second weight value when the remaining distance is smaller than the average entry distance and the vehicle is outside a queue entry region.

5. The apparatus of claim 4, wherein the instructions further comprise, when the vehicle saturation degree is lower than a preset threshold, overriding the decrease of the first weight value and maintain or increase the first weight value.

6. The apparatus of claim 5, wherein when the remaining distance is smaller than a minimum enterable distance derived from the driver personal pattern, forcibly decreasing the first weight value to be smaller than the second weight value regardless of the vehicle saturation degree.

7. A method for driver pattern-based route guidance, comprising providing a route including at least one entry or exit road to a destination through a navigation system;

receiving lane-level position information of a vehicle;

determining whether the vehicle has entered a waiting queue lane at a beginning of a waiting queue of a first entry or exit road based on the lane-level position information;

in response to determining that the driver's vehicle has not entered the waiting queue lane:

calculating, in real time, a vehicle saturation degree of the waiting queue based on at least one of a length of the waiting queue, a number of waiting vehicles, an average moving speed of the waiting vehicles, traffic information, and an inter-vehicle distance between waiting vehicles;

generating a driver pattern model based on a driving record including at least one of route history, queue entry history, lane change behavior, and driving speed history;

detecting a driver personal pattern through the driver pattern model, the driver personal pattern including an average entry distance corresponding to an average remaining distance to the first entry or exit road at a time point at which the driver's vehicle enters the waiting queue, and an average entry timing corresponding to an average elapsed time from activation of a turn signal to entry into the waiting queue;

comparing a current remaining distance to the first entry or exit road with the average entry distance;

determining a first weight value for a first route passing through the first entry or exit road based on the comparison result, the vehicle saturation degree, and a minimum enterable distance derived from the driver personal pattern; and comparing the first weight value with a second weight value for a second route passing through a second entry or exit road; and controlling the navigation system to maintain guidance of the first route when the first weight value is greater than the second weight value, or switch route guidance to the second route when the second weight value is greater than the first weight value.

8. The method of claim 7, wherein:

the lane-level position information of the vehicle is received from a global navigation satellite system (GNSS).

9. The method of claim 7, wherein determining the first weight value comprises increasing the first weight value relative to the second weight value when a current remaining distance to the first entry or exit road exceeds the average entry distance included in the driver personal pattern.

10. The method of claim 9, wherein determining the first weight value further comprises decreasing the first weight value relative to the second weight value when the current remaining distance to the first entry or exit road is smaller than the average entry distance included in the driver personal pattern.

11. The method of claim 10, wherein determining the first weight value further comprises maintaining or increasing the first weight value when the vehicle saturation degree calculated in real time is lower than a preset threshold, even when the current remaining distance to the first entry or exit road is smaller than the average entry distance included in the driver personal pattern.

12. The method of claim 11, wherein determining the first weight value further comprises decreasing the first weight value relative to the second weight value when the current remaining distance to the first entry or exit road is smaller than a minimum enterable distance derived from the driver personal pattern, regardless of the vehicle saturation degree.

* * * * *